(12) United States Patent
Yeh

(10) Patent No.: US 7,805,741 B2
(45) Date of Patent: Sep. 28, 2010

(54) SYSTEMS AND METHODS FOR NETWORKING DIGITAL VIDEO RECORDERS

(75) Inventor: Shih-Hsien Yeh, Shinjuang (TW)

(73) Assignee: Cyberlink Corp., Shindian, Taipei (TW)

(*) Notice: Subject to any disclaimer, the term of this patent is extended or adjusted under 35 U.S.C. 154(b) by 593 days.

(21) Appl. No.: 11/224,843

(22) Filed: Sep. 13, 2005

(65) Prior Publication Data

US 2007/0058924 A1    Mar. 15, 2007

(51) Int. Cl.
- G06F 3/00 (2006.01)
- G06F 13/00 (2006.01)
- H04N 5/445 (2006.01)
- H04N 9/00 (2006.01)
- H04N 11/00 (2006.01)
- H04N 5/91 (2006.01)
- H04N 7/00 (2006.01)

(52) U.S. Cl. .................. 725/37; 725/39; 725/48; 725/51; 386/1; 386/46; 386/66

(58) Field of Classification Search .................. 725/31; 386/46
See application file for complete search history.

(56) References Cited

U.S. PATENT DOCUMENTS

| | | | | |
|---|---|---|---|---|
| 5,576,755 | A * | 11/1996 | Davis et al. ............... | 725/48 |
| 7,515,207 | B2 * | 4/2009 | Nakao ....................... | 348/564 |
| 2001/0046366 | A1 * | 11/2001 | Susskind ................... | 386/46 |
| 2002/0059596 | A1 * | 5/2002 | Sano et al. ................ | 725/39 |
| 2003/0086023 | A1 * | 5/2003 | Chung et al. .............. | 348/714 |
| 2003/0120758 | A1 * | 6/2003 | Yassin et al. ............. | 709/221 |
| 2004/0001087 | A1 | 1/2004 | Warmus et al. ........... | 345/745 |
| 2004/0068739 | A1 * | 4/2004 | Russ et al. ................ | 725/39 |
| 2004/0078807 | A1 * | 4/2004 | Fries et al. ............... | 725/14 |
| 2004/0156614 | A1 * | 8/2004 | Bumgardner et al. ..... | 386/46 |
| 2005/0022241 | A1 * | 1/2005 | Griggs ....................... | 725/48 |
| 2005/0050578 | A1 * | 3/2005 | Ryal .......................... | 725/143 |
| 2005/0108769 | A1 * | 5/2005 | Arnold et al. ............. | 725/115 |
| 2006/0107286 | A1 * | 5/2006 | Connor et al. ............ | 725/31 |
| 2006/0143668 | A1 * | 6/2006 | Du Breuil ................. | 725/89 |

FOREIGN PATENT DOCUMENTS

EP      1 377 046 A2    1/2004

OTHER PUBLICATIONS

European Search Report.

* cited by examiner

*Primary Examiner*—Christopher Kelley
*Assistant Examiner*—Justin E Shepard
(74) *Attorney, Agent, or Firm*—Thomas, Kayden, Horstemeyer & Risley, LLP

(57) ABSTRACT

A digital video recording system is provided that comprises a plurality of digital video recorders in communication with a digital video recorder proxy system. Each of the plurality of digital video recorders is connected to a network and the digital video recorders are configured to send its status to the digital video recorder proxy system when a status change to its local resources occurs. The system further includes a digital video recorder proxy system configured to consolidate program guide information from each of the plurality of digital video recorders. The program guide information is stored in a database. Finally, the digital video recorder proxy system is configured to display the consolidated program guide information.

20 Claims, 12 Drawing Sheets

SYSTEMS AND METHODS FOR NETWORKING DIGITAL VIDEO RECORDERS

TECHNICAL FIELD

The present disclosure is generally related to digital video recorders and, more particularly, is related to a system and method for providing services through a network of digital video recorders.

BACKGROUND

In recent years, digital video recorders have gained popularity because of the convenience these systems provide in viewing and recording television programs. Digital video recorders, or DVRs (also known as personal video recorders), integrated with electronic program guide data (EPG), provide consumers with a very convenient means of scheduling recordings in an interactive fashion, days or weeks ahead of time. EPGs are on-screen guides, which contain scheduling and programming information and are typically presented in the form of a user interface. Information about programs (e.g., program title, actors, synopsis, etc.) is provided to help the client decide which program to view or record. Consumers can now even schedule their digital video recorder to record every episode of a television series without having to manually program the system to record each episode. Furthermore, given the state of today's storage devices, consumers are no longer limited to recording just a few hours of television, as with video cassette recording. Consumers can now store many hours of content on their digital video recorders at a reasonable cost and build an archive for later viewing.

Given the increasing popularity of digital video recorders, it's not uncommon to find consumers with multiple digital video recorders in their homes. Furthermore, it's possible that a consumer might elect to receive content from multiple media providers. As an example, a television in the living room might receive content from a cable operator and be connected to a digital video recorder, such as the TIVO brand digital video recorder manufactured by TIVO. Electronic program guide data may be updated periodically via either cable signals or Internet signals. In another part of the house, another television might receive content from a satellite dish provider, which might furnish its own digital video recorder. In some instances a digital video recorder might even be integrated into the satellite receiver (e.g., the DISH NETWORK brand receiver/DVR). In yet another part of the house, a television might be set up to receive a high definition television signal and be connected to a digital video recorder.

One motivation for having multiple digital video recorders might be for the added convenience of having digital video recorders available in different parts of the house (e.g., the living room, the bedroom, etc.) while having a wide assortment of channels to select from. Another motivation for having multiple digital video recorders might be a desire to record two, three and perhaps even more programs showing in a given timeslot. With such potential scheduling conflicts, the consumer has to figure out which digital video recorder is available and then program each digital video recorder to record the desired program. Although a consumer might have the convenience of having multiple digital video recorders at home, each unit essentially operates as an independent unit if the electronic program guide on each digital video recorder is not from the same source. A consumer might also desire to view a previously recorded program. In the event that the consumer can't remember which digital video recorder the program is recorded on, the consumer has to go to each digital video recorder and search through its archive of recorded content to find the desired program. Furthermore, as the number of digital video recorders on a network grows, it becomes more challenging to monitor the status of each unit. For example, it would be useful to know the remaining storage capacity on a given unit so that a program scheduled to be recorded won't either be only partially recorded or be recorded over another previously recorded program due to lack of storage space. It would be useful to know in this scenario whether there is an alternate unit with more storage space capable of receiving and recording the same program.

Reference is now made to FIG. 1, which depicts a block diagram of a prior art setup for digital video recorders in a network environment. DVRs are connected to some type of content provider (e.g., a cable TV headend, a satellite signal, etc.) A person then accesses the EPG data to schedule recordings through an interactive user interface. As shown in FIG. 1, a consumer will, in some cases, have multiple DVRs in their home. Digital video recorder 1 (DVR1) 108, digital video recorder 2 (DVR2) 116, and digital video recorder 3 (DVR3) 120 might all be connected to a network 112. The network 112 might be any communications network, including the Internet. Program guide data servers 102, 104, which provide EPG data to the DVRs, reside at a remote location. A different program guide data server is accessed for each different service provider of EPG data. For example, DVR1 108 might receive content from a cable operator and receive EPG data from a TIVO server. DVR3 120 and DVR2 116, on the other hand, might receive content from a satellite service provider and receive EPG data from a TVGUIDE server. All of the DVRs have corresponding displays 106, 114, 118 and operate independently as stand alone units. In the event of a scheduling conflict, the user resorts to programming each DVR and manually in order to address any scheduling conflicts. For example, the user may wish to record a program on a particular DVR and find that another recording has already been scheduled for that same timeslot. The user then has to determine whether another DVR is available to record the program.

FIG. 2 depicts a block diagram of a prior art setup where EPG data is downloaded by each digital video recorder from a respective program guide server. DVR1 108, which receives its EPG data from a different provider than DVR2 116, periodically downloads up-to-date program guide data 202 from program guide data server1 102. Likewise, DVR2 116 periodically downloads up-to-date program guide data 204 from program guide data server2 104. Upon a successful download, each DVR will contain the most current program guide data 206, 208. The two sets of EPG data are incompatible however, and therefore the DVRs 108, 116 can only operate independently.

Therefore, there exists a need, among others, for providing consumers with the ability to manage the resources of a plurality of digital video recorders from one central location, regardless of the electronic program guide format in order to address the aforementioned deficiencies and inadequacies.

SUMMARY

Briefly described, one embodiment, among others, may be implemented as providing methods for managing a plurality of digital video recorders. In this regard, one embodiment of such a method, among others, includes the steps of receiving a status update from at least one of a plurality of digital video recorders when a change in a resource occurs; storing the status update received in a database; consolidating program guide information from the at least one of the plurality of digital video recorders; presenting the consolidated program guide information to a client; and receiving viewing, recording or browsing requests from the client.

One embodiment of the system may be comprised of a computer-readable medium having a computer program for providing management of a network of digital video recorders. The digital video recorders on the network are comprised of logic configured to communicate with a digital video recorder proxy system. Each of the plurality of digital video recorders is connected to a network and the digital video recorders are configured to send its status to the digital video recorder proxy system upon any status change to its local resources. The system is further implemented as logic configured to consolidate dissimilar program guide information from each of the plurality of digital video recorders, wherein the program guide information is stored in a database, the digital video recorder proxy system further configured to display the consolidated program guide information.

Another embodiment of the digital video recorder proxy system may comprise a plurality of digital video recorders in communication with a digital video recorder proxy system. Each of the plurality of digital video recorders may be connected to a network and the digital video recorders are configured to send its status to the digital video recorder proxy system upon any status change to its local resources. Furthermore, the digital video recorder proxy system may be configured to consolidate dissimilar program guide information from each of the plurality of digital video recorders, wherein the program guide information may be stored in a database, the digital video recorder proxy system further configured to display the consolidated program guide information.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of a digital video recorder proxy system and the underlying methods can be better understood with reference to the following drawings. The components in the drawings are not necessarily to scale, emphasis instead being placed upon clearly illustrating the principles of a digital video recorder proxy system and the underlying methods. Moreover, in the drawings, like reference numerals designate corresponding parts throughout the several views.

DETAILED DESCRIPTION

Figure 1:
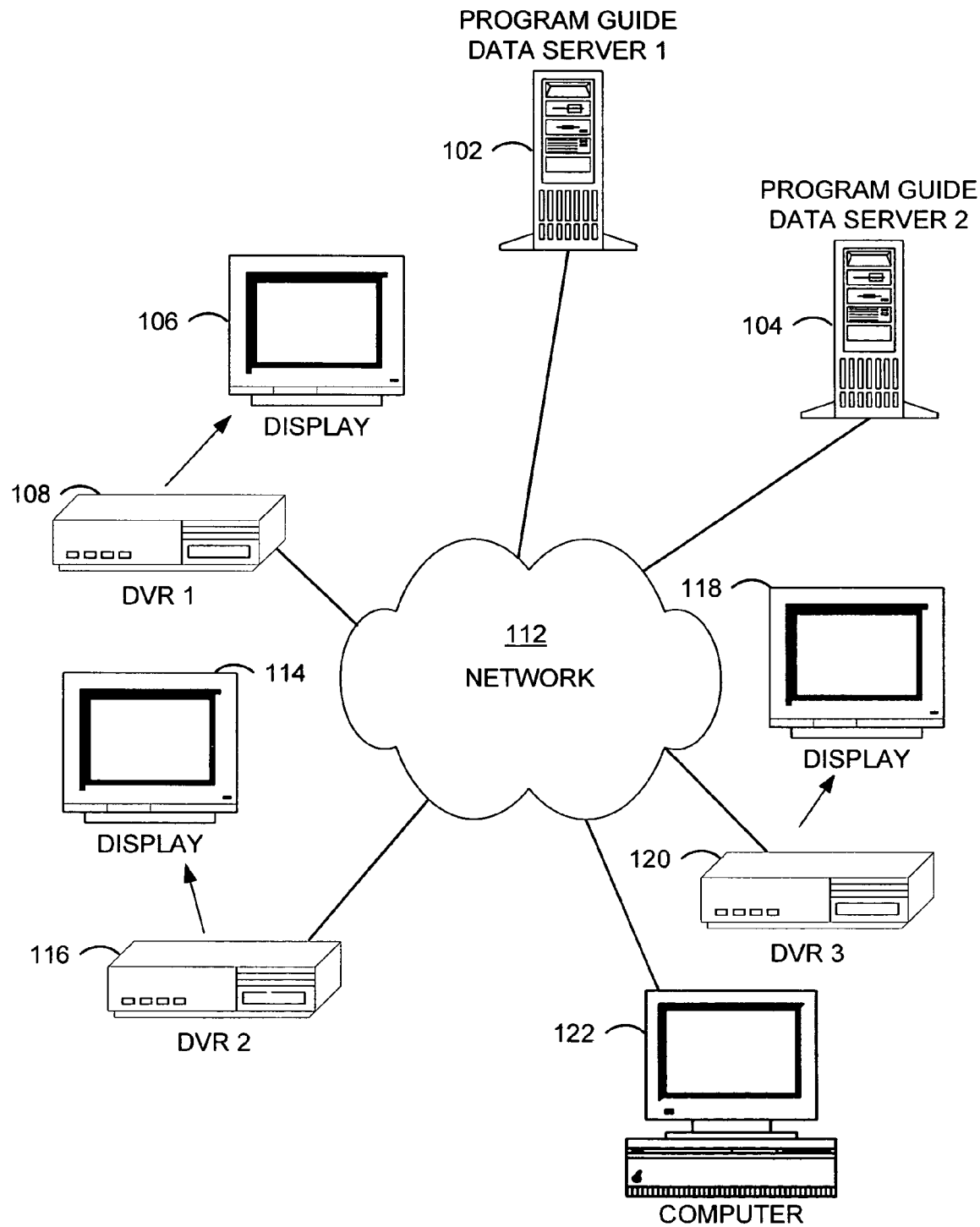
FIG. 1 depicts a block diagram of a prior art setup for DVRs in a network environment.
Figure 2:
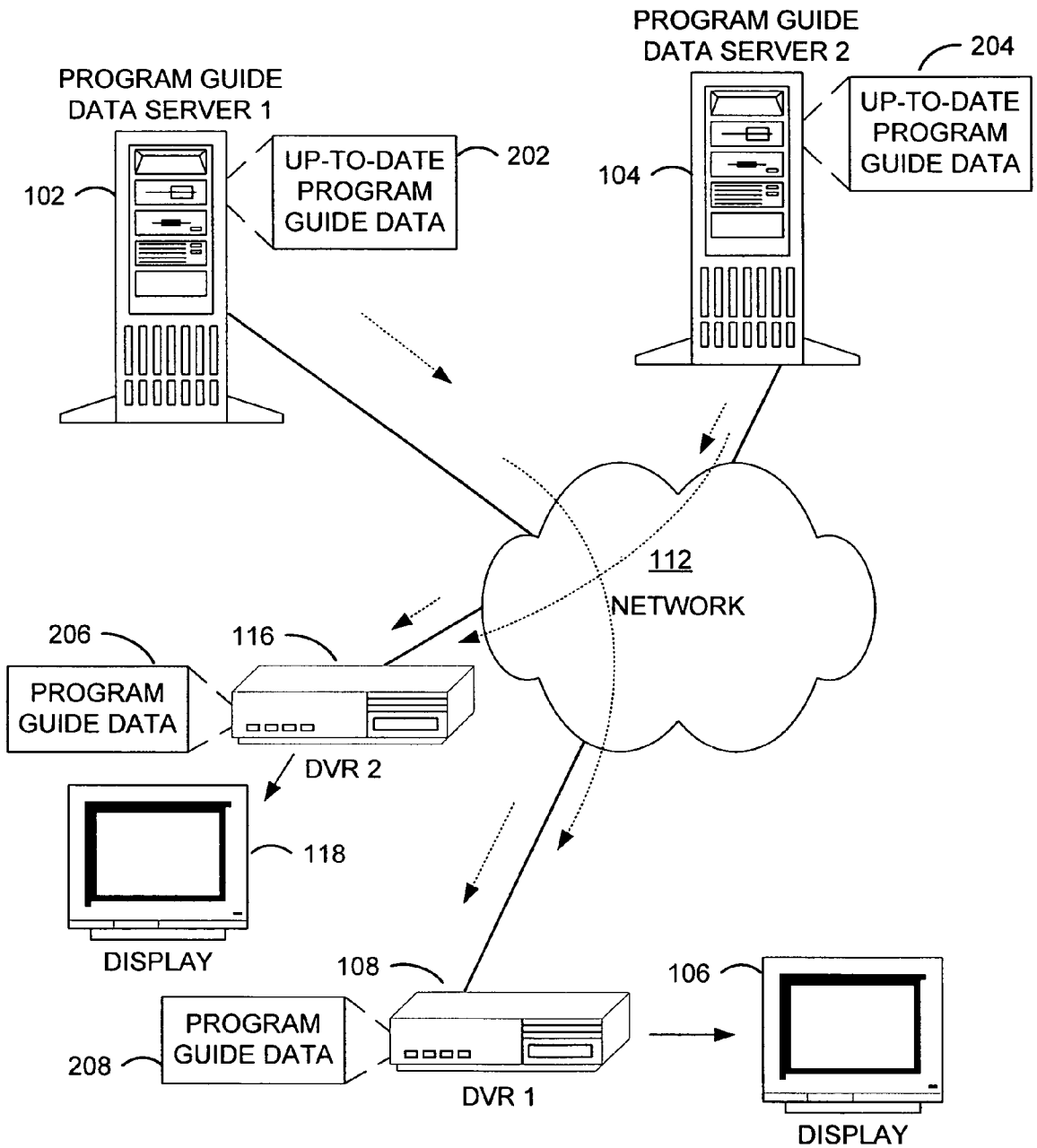
FIG. 2 depicts a block diagram of a prior art setup where program guide data is downloaded by each DVR from a respective server.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 3:
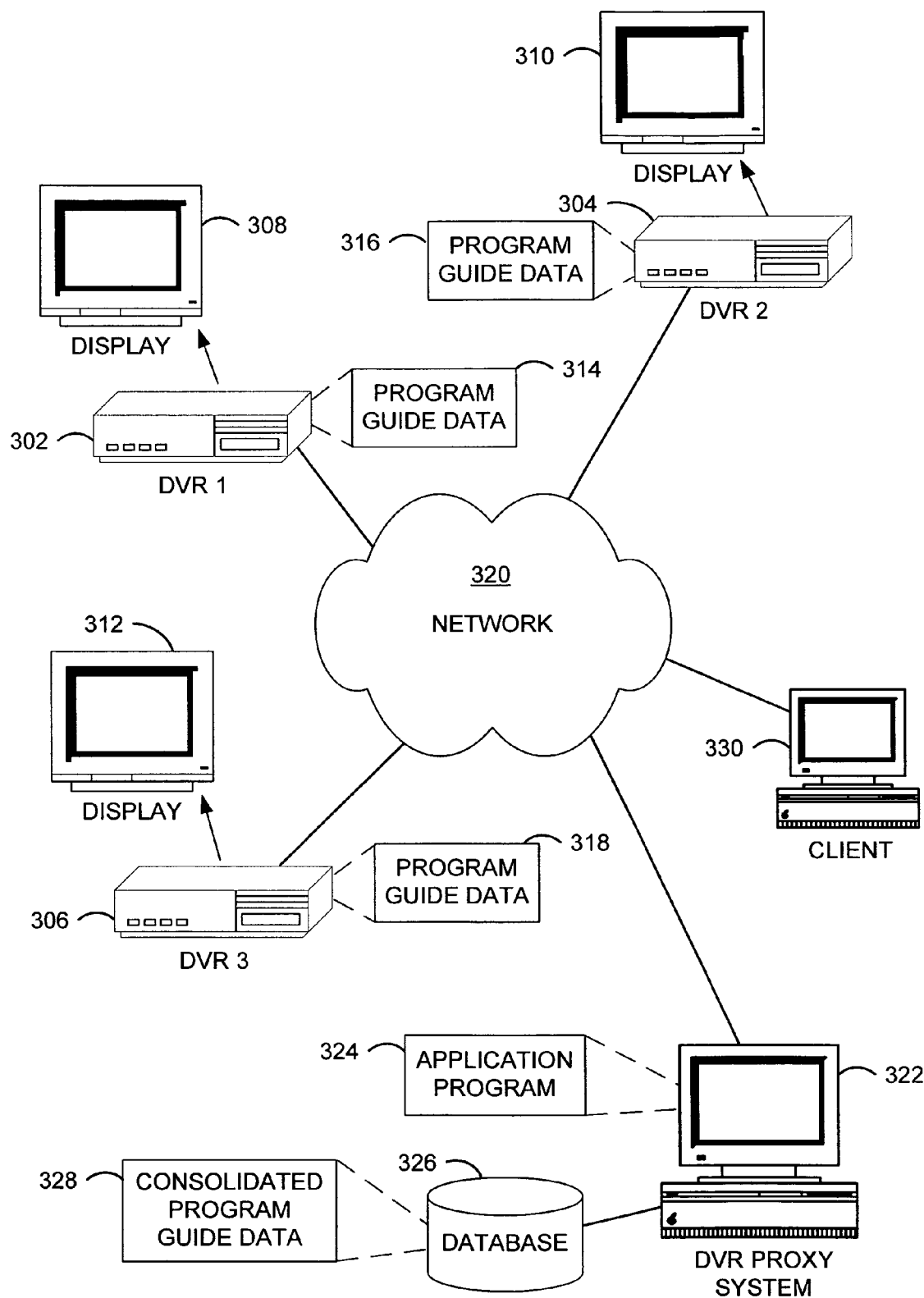
FIG. 3 depicts a block diagram of one embodiment of the DVR proxy system.

Reference is now made to FIG. 3, which depicts a block diagram of one embodiment of the DVR proxy system with multiple DVRs 302, 304, 306 coupled to corresponding display device 308, 310, 312. Each DVR contains EPG data 314, 316, 318 used for recording and viewing programs. The DVRs 302, 304, 306 in FIG. 3 are all interconnected through a network 320, which may, for example, be a LAN, WAN or the Internet. One of ordinary skill in the art will appreciate that the physical medium connecting the DVRs 302, 304, 306 to the network 320 is not limited to any particular medium and may be comprised of, but not limited to, a wireless connection, an Ethernet connection, etc.

It should be appreciated that, although not specifically illustrated, the DVR is not necessarily coupled to the display device, but rather that the DVR still can operate itself without being coupled to the display device. Further, the EPG data may not only be transmitted via network from the program guide data server, but may also be transmitted via cable as cable signals include EPG data.

The DVR proxy system 322 shown in the block diagram manages each of the resources (i.e., DVRs 302, 304, 306) available on the network 320. Furthermore, an application program 324 running on the DVR proxy system provides an interactive user interface for managing the DVRs 302, 304, 306. The DVR proxy system 322 may be further comprised of a database 326 for storing miscellaneous information, including consolidated EPG data 328. Generally speaking, the DVR proxy system 322 can be comprised of any one of a number of devices, including but not limited to, a computer system or a digital video recorder. It should be noted that the DVR proxy system 322 also performs conflict management among all the DVRs 302, 304, 306. For example, a scheduling or viewing conflict might be handled by the DVR proxy system 322. Suppose, for example, that multiple clients send a request to view the same program, which is available on only one particular DVR. The proxy system might process the requests on a first-come, first-serve basis and set the priority for viewing accordingly.

A client 330 generates requests (e.g., a request to record or view a TV program) through the application program 324 running on the DVR proxy system 322. Generally speaking, the client might be a computer system, a television or simply another digital video recorder on the network. The client 330 communicates to the DVR proxy system 322 through the network 320, and the DVR proxy system 322 receives and executes requests from the client 330.

In processing a request, the DVR proxy system 322 determines the proper DVR to handle the request sent from the client 330 and forwards the request accordingly. The DVR proxy system 322 is kept up-to-date on the current status of each DVR 302, 304, 306 on the network 320 in real time. Updates are made contemporaneously with a triggering event. A triggering event might include, but is not limited to, a change in storage capacity, a hardware malfunction, an EPG data update, etc. The status of each DVR 302, 304, 306 may then be stored in a database 326. This data may be used in the decision-making process of where to route a request.

Furthermore, the DVR proxy system 322 consolidates all EPG data 314, 316, 318 and maintains a database which includes the consolidated EPG data 328. Regardless of the source of the EPG data, the DVR proxy system 322 integrates all the data and displays this information for the client 330 to reference. Therefore, the EPG data 314, 316, 318 from each of the DVRs may be from different EPG providers (e.g., TIVO vs. TVGUIDE). The DVR proxy system 322 provides a seamless interface via the application program 324 to view the consolidated EPG data 328. All the EPG data 314, 316, 318 from the various DVRs 302, 304, 306 may be stored at one central location and presented to the client 330 in an integrated fashion.

Another potential advantage is that the DVR proxy system 322 performs conflict management among the DVRs 302, 304, 306 such as solving a scheduling or viewing conflict. For example, multiple clients may request to view the same program, which may be available on only one particular DVR. The DVR proxy system 322 may be configured to process the requests on a first-come, first-serve basis and set the priority for viewing accordingly.

Yet another potential advantage of the DVR proxy system 322 is that remote clients (i.e., offsite users) can query the consolidated EPG data 328 at one centralized location, the DVR proxy system 322, and send a request remotely over the network 320. The DVR proxy system 322 aggregates the EPG data 314, 316, 318 from all the DVRs 302, 304, 306 on the network and provides a fully integrated user interface for the remote client to utilize. The remote client might then use this interface, for example, to select a previously recorded program to play back or to select a program to record. The EPG data 328 on the DVR proxy system 322 is kept up-to-date since all the DVRs 302, 304, 306 are responsible for uploading its EPG data to the DVR proxy system 322 when there's an update.

Figure 4:
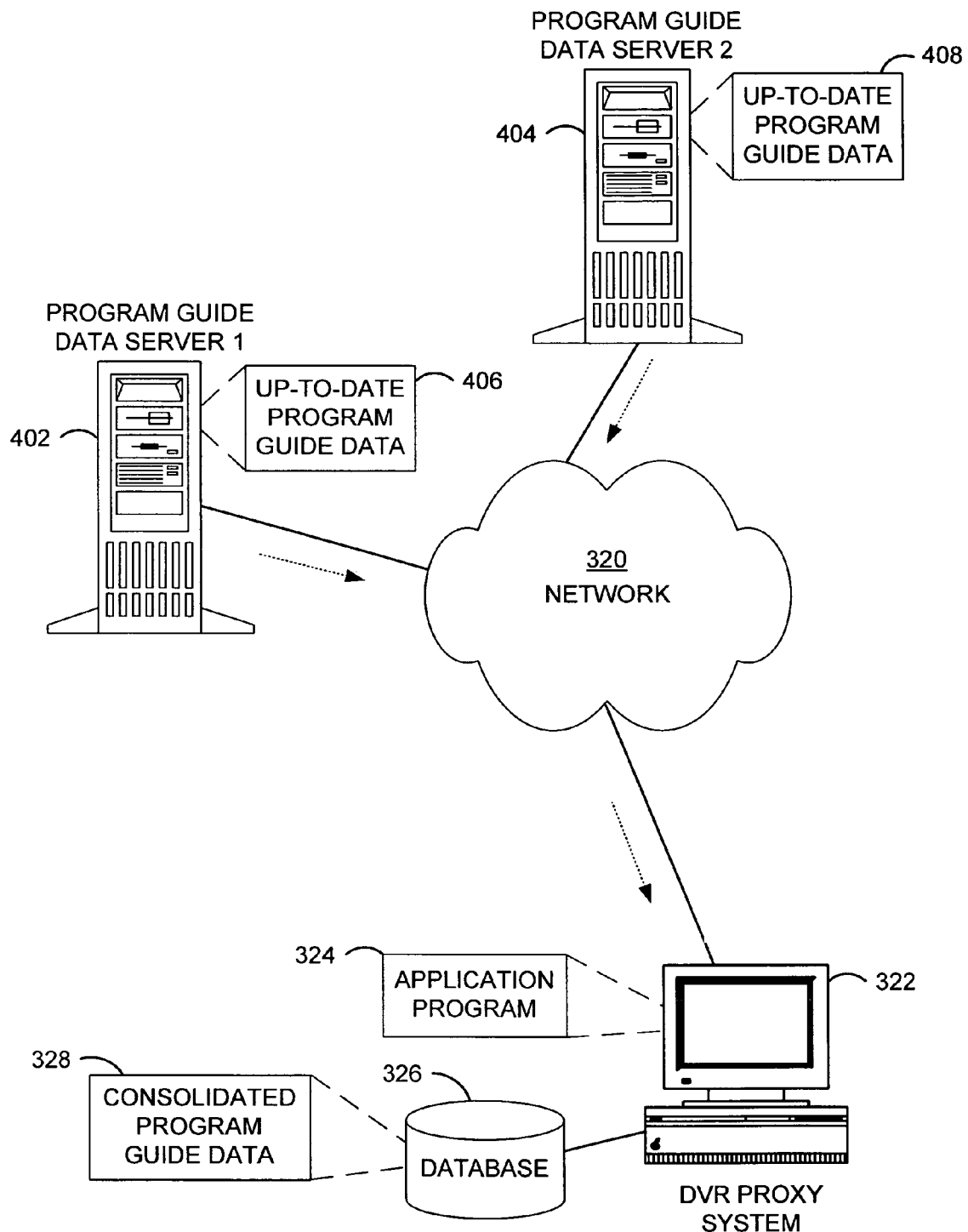
FIG. 4 depicts a block diagram of the system of FIG. 3 where program guide data is downloaded directly to the DVR proxy system.

FIG. 4 depicts another embodiment of the system of FIG. 3 where program guide data may be downloaded directly to the DVR proxy system 322. The DVR proxy system 322 may be in communication with EPG data servers 402, 404 via the network 320. Rather than downloading EPG data from each DVR, the DVR proxy system 322 downloads EPG data associated with each DVR directly from the EPG data servers 402, 404 and consolidates the data 328 in a database 326. The client 330 then has access to scheduling and programming data for all the DVRs 302, 304, 306 on the network via the application program 324 running on the DVR proxy system 322.

Figure 5A:
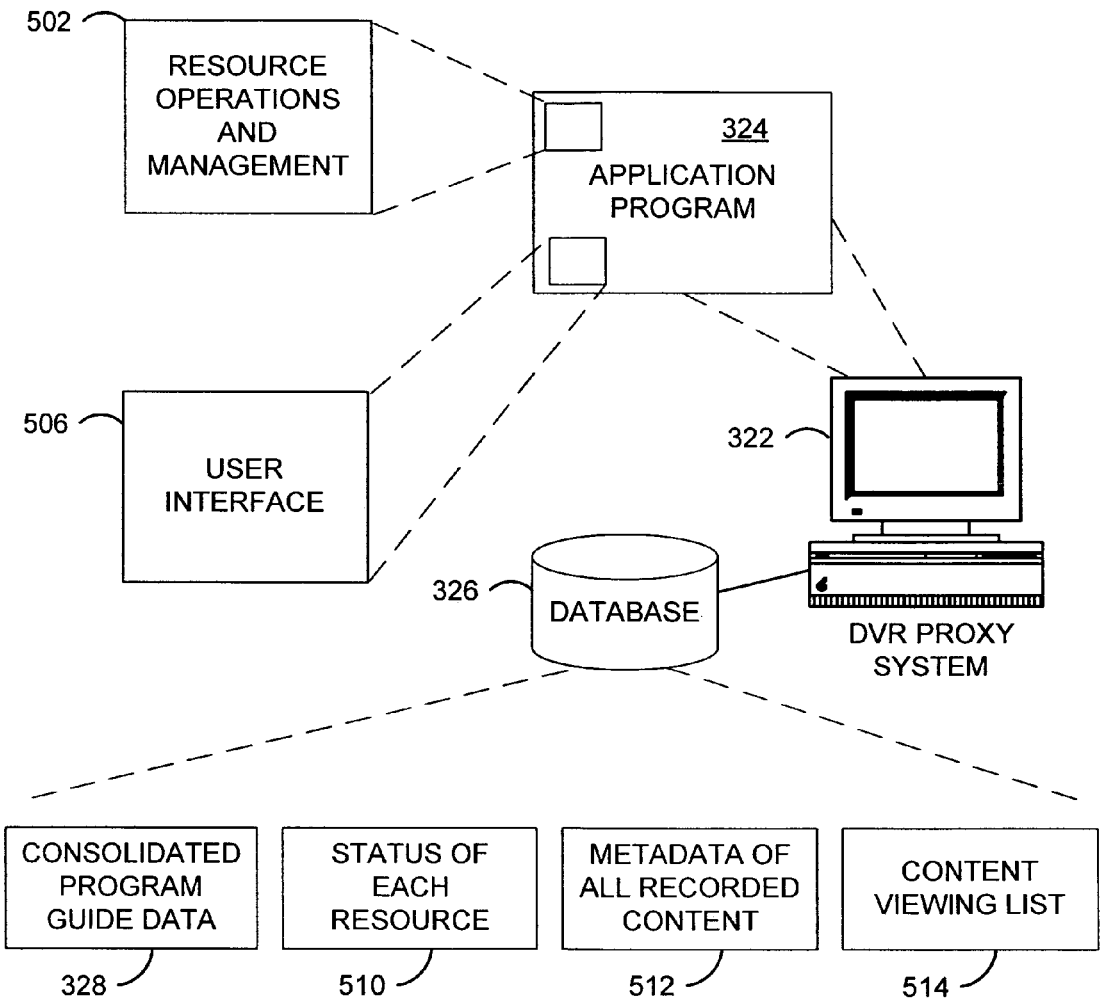
FIG. 5A illustrates certain components of the application program and database of the system of FIG. 3.

FIG. 5A illustrates certain components of the application program and database of the DVR proxy system 322. The application program 324 running on the DVR proxy system 322 includes a resource operations and management module 502. Among other things, this module 502 receives EPG information 314, 316, 318 for management and scheduling recording purposes. The module 502 also receives resource status updates from each DVR 302, 304, 306. Each DVR 302, 304, 306 may be responsible for sending an update to the DVR proxy system 322 in the event of a change in status (i.e., the occurrence of a triggering event). Based on the updates received from the DVRs 302, 304, 306 module 502 may be able to determine the availability of resources in the event a request is received from the client 330. The DVR proxy system 322 is constantly kept up-to-date on the status and capacity of each DVR in the network through module 502 and can therefore determine which DVR to forward a client request to without having to poll each DVR for its status.

The user interface 506 displays to the client 330 the consolidated EPG data 328 collected from each DVR 302, 304, 306 in an integrated fashion. This provides the client 330 with the entire assortment of viewing and scheduling options offered by all the DVRs 302, 304, 306. Based on this information, the client 330 generates a request (i.e., a viewing, browsing, or recording request) which will be forwarded by the DVR proxy system 322 to the appropriate DVR. For example, the client 330 can search a list using the user interface 506 to select a movie to view, without having to determine which DVR the movie is stored in. From the client's 330 viewpoint, all the content stored in the plurality of DVRs 302, 304, 306 comprises one large archive to select from, regardless of the source of the content (e.g., cable vs. satellite) and regardless of the source of the EPG data.

The database 326 stored on the DVR proxy system 322 includes consolidated EPG data 328, the status of each resource 510, metadata of all recorded content 512, and a content viewing list 514. The metadata 512, which contains data about the contents of the recorded program, may be utilized when the client 330 conducts a search. The metadata 512 might contain miscellaneous information about a given program, including the following: title, episode name/title, content rating (e.g., General (G), Parental Guidance (PG), PG-13, Restricted (R)), performers (actors, actresses, musicians, etc.), genre (adventure, romance, action, etc.) and finally, a brief synopsis of the program.

In the context of this document, a "computer-readable medium" can be essentially anything that can store, communicate, or transport the program for use by or in connection with the instruction execution system, apparatus, or device. The computer readable medium can be, for example, but not limited to, an electronic, magnetic, optical, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Figure 5B:
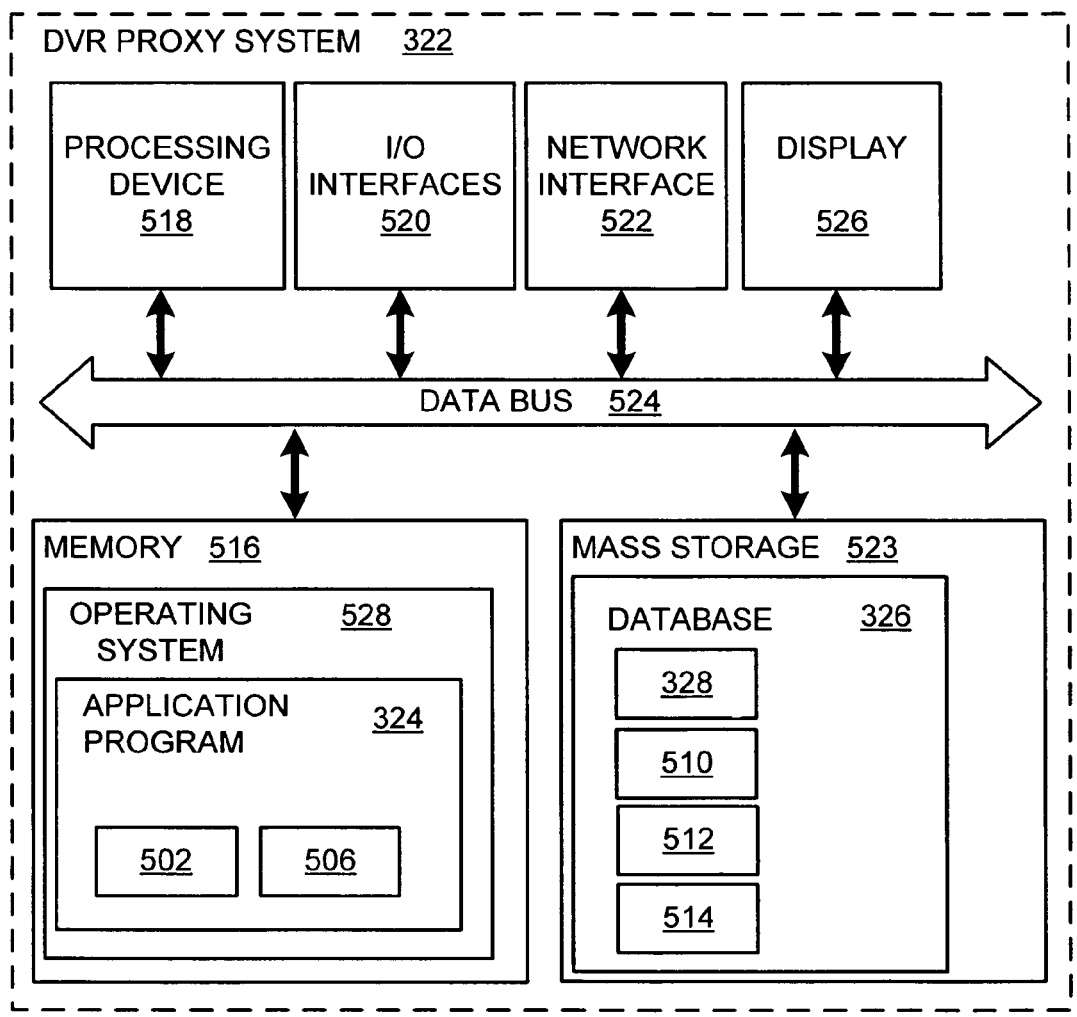
FIG. 5B depicts a block diagram illustrating an exemplary embodiment of the DVR proxy system on which the application program may be executed.

FIG. 5B depicts a block diagram illustrating an exemplary embodiment of the DVR proxy system 322 on which the application program 324 may be executed and where the database 326 may be stored. Generally speaking, the DVR proxy system 322 can comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, the DVR proxy system 322 can, for instance, comprise memory 516, a processing device 518, a number of input/output interfaces 520, a network interface device 522, and mass storage 523, wherein each of these devices are connected across a data bus 524. Display 526 can comprise a computer monitor or a plasma screen for a PC or a liquid crystal display (LCD) on a hand held device, for example.

Processing device 518 can include any custom made or commercially available processor, a central processing unit (CPU) or an auxiliary processor among several processors associated with the DVR proxy system 322, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 516 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 516 typically comprises a native operating system 528, one or more native applications, emulation systems, or emulated applications for any of a variety of operating systems and/or emulated hardware platforms, emulated operating systems, etc. For example, the applications may include the application program 324, which may include the resource operations and management module 502 as well as the user interface 506 which the client 330 uses to send requests. One of ordinary skill in the art will appreciate that memory 528 can, and typically will, comprise other components, which have been omitted for purposes of brevity.

Input/output interfaces 520 provide any number of interfaces for the input and output of data. For example, where the DVR proxy system 322 comprises a personal computer, these components may interface with a user input device 520, which may be a keyboard or a mouse. Where the DVR proxy system 322 comprises a handheld device (e.g., PDA, mobile telephone), these components may interface with function keys or buttons, a touch sensitive screen, a stylist, etc.

With further reference to FIG. 5B, network interface device 522 comprises various components used to transmit and/or receive data over network 320. By way of example, the network interface device 522 may include a device that can communicate with both inputs and outputs, for instance, a modulator/demodulator (e.g., a modem), wireless (e.g., radio frequency (RF)) transceiver, a telephonic interface, a bridge, a router, network card, etc.)

Figure 6:
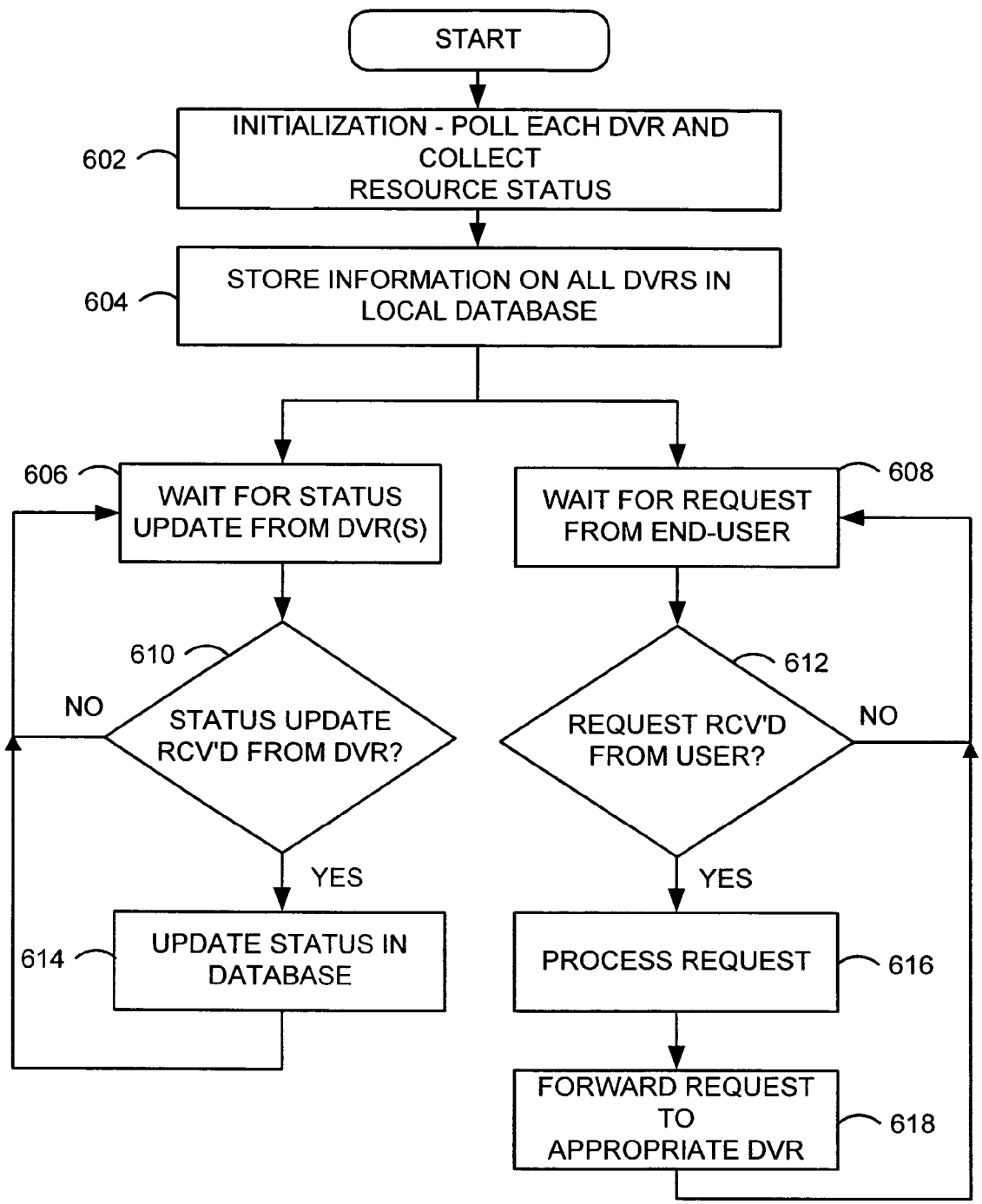
FIG. 6 is a flowchart of one embodiment of a method for processing requests and resource status updates through the system of FIG. 3.

FIG. 6 is a flowchart of one embodiment of a method for processing requests and resource status updates through the system of FIG. 3. Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the DVR proxy system 322 in which functions may be executed out of order from that shown or discussed, including substantially concurrently or in reverse order, depending on the functionality involved, as would be understood by those reasonably skilled in the art.

In block 602, the system undergoes an initialization process whereby the DVR proxy system 322 polls each DVR 302, 304, 306 on the network 320 and collects the status of each DVR. This will typically be the only time when the DVR proxy system 322 polls each of the DVRs. Once the system is initialized, each DVR 302, 304, 306 from that point on will be responsible for unilaterally sending a status update to the DVR proxy system 322 whenever there is a change in a local resource (e.g., change in storage capacity, update in EPG data). This negates the need for the DVR proxy system 322 to periodically poll each DVR 302, 304, 306 on the network for its status and therefore results in more efficient use of network bandwidth.

Once status information is received it may be stored in a database 326 in block 604. The database 326 is coupled to the resource operations and management module 502 running on the DVR proxy system 322.

At block 606, the DVR proxy system 322 waits for status updates from the DVRs on the network. If a status update is received by a DVR in block 610, the status for that particular DVR may be updated in the database 326 of the DVR proxy system 322. The database of the DVR proxy system 322 will be updated whenever there is a condition change at any of the DVRs 302, 304, 306 as each DVR will automatically send its resource status to the DVR proxy system 322 when there's a change in status of its local resources.

In block 608, while waiting for status updates from the plurality of DVRs on the network, the DVR proxy system 322 also waits for a request (e.g., a viewing or scheduling request for a TV program) from the client 330.

If a request is received by the client 330 in block 612, the request may be processed by the DVR proxy system 322 and then forwarded to the appropriate DVR in block 618. For example, if the client 330 generates a request to record a program, the DVR proxy system 322 determines the appropriate DVR to handle the request and then forwards the request to that DVR. The client 330 is able to perform this task at one central location.

Figure 7:
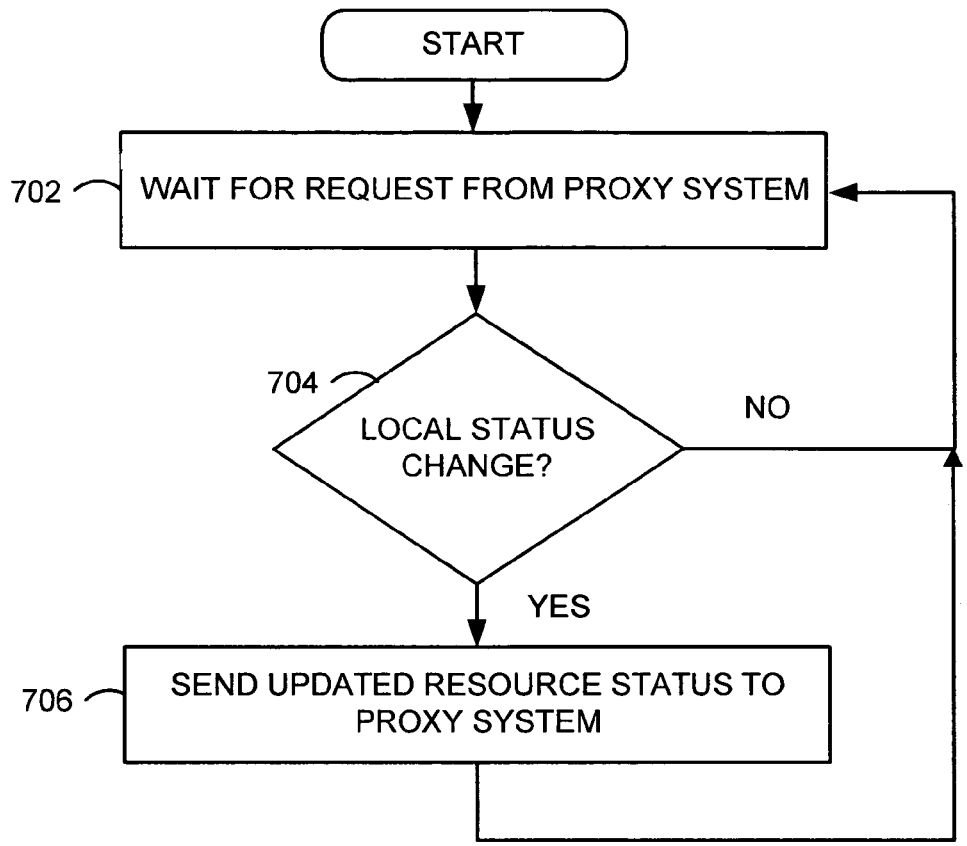
FIG. 7 is a flowchart of one embodiment of a method for updating the DVR proxy system when a triggering event occurs.

FIG. 7 is a flowchart of one embodiment of a method for updating the DVR proxy system 322 when a triggering event occurs. In block 702, the DVRs 302, 304, 306 wait for a request from the DVR proxy system 322. As an example, the request might be a viewing request or a recording request.

At block 704, the DVRs 302, 304, 306 monitor any status change in its local resources and immediately send an update to the DVR proxy system 322 in block 706 in the event a triggering event occurs. For example, an update may be sent if the storage capacity of a particular DVR changes. Another example of a triggering event may be a channel change. Yet another example may be an update to the EPG data. If there is no change in status, the DVRs continue to wait for a request.

Figure 8:
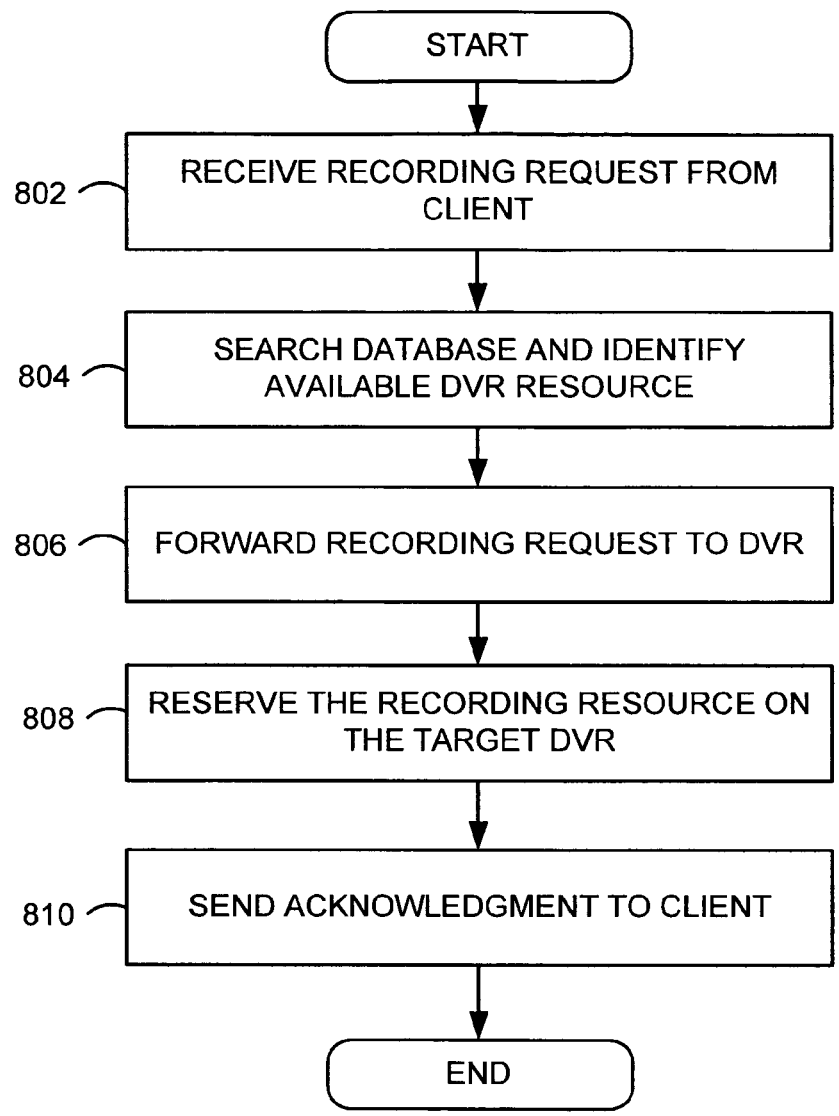
FIG. 8 is a flowchart of one embodiment of a method for processing a recording request by the DVR proxy system in FIG. 3.

FIG. 8 is a flowchart of one embodiment of a method for processing a recording request by the DVR proxy system in FIG. 3. In block 802, the DVR proxy system 322 receives a recording request from a client 330 such as a request to record a particular TV program. Upon receiving the request, the DVR proxy system 322 searches its database 326 and identifies which DVR 302, 304, 306 on the network 320 is available to handle the request. The request is then forwarded in the appropriate DVR in block 806. The DVR proxy system 322 also reserves the local resource on the target DVR to guarantee availability of that resource when request is to be performed. Finally, in block 810, an acknowledgment may be generated and sent back to the client 330.

Figure 9:
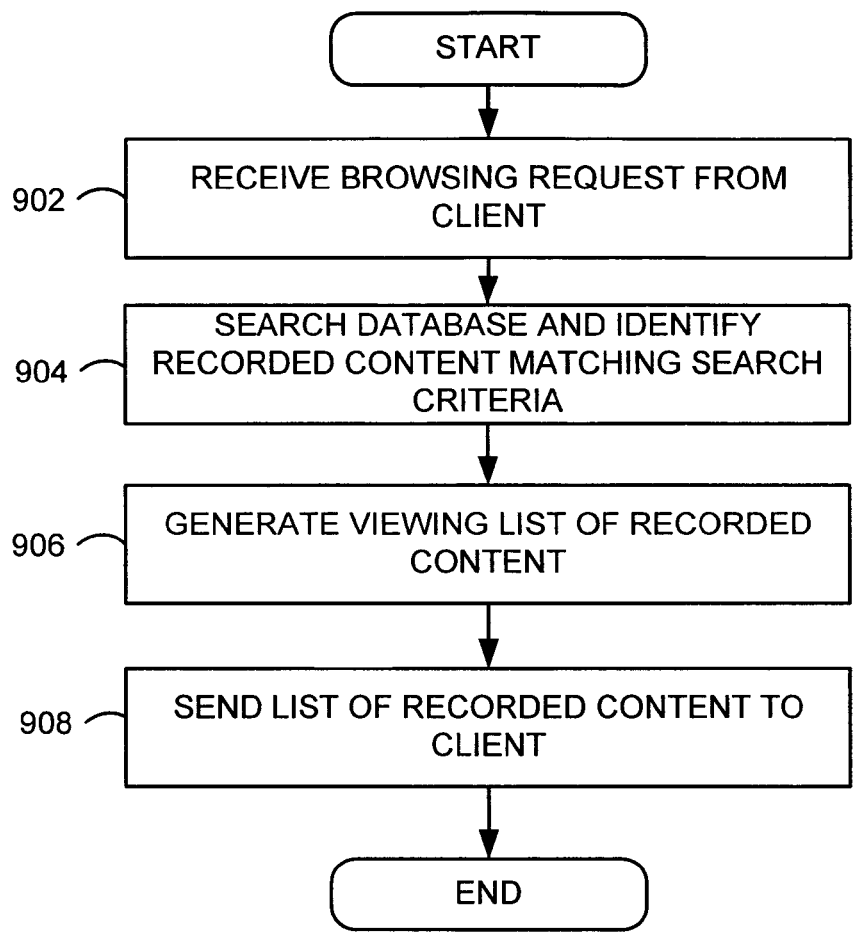
FIG. 9 is a flowchart of one embodiment of a method for processing a browsing request by the DVR proxy system in FIG. 3.

FIG. 9 is a flowchart of one embodiment of a method for processing a browsing request by the DVR proxy system 322 in FIG. 3.

In block 902, the DVR proxy system 322 receives a browsing request from a client 330 to view the consolidated EPG data. As an example, the user may specify some type of search criteria through the application program 324

In block 904, the DVR proxy system 322 searches its database 326 and identifies recorded content matching the search criteria specified by the user. In one embodiment, the search may involve metadata of each of the programs stored in all the DVRs on the network. The metadata might contain, for example, a list of main actors/actresses in the program, the year the program was produced, content rating, genre and so on. In block 906, once the programs matching the search criteria have been identified, a list of all the hits is produced. This list of programs matching the search criteria may then be forwarded by the DVR proxy system 322 back to the client 330.

Figure 10:
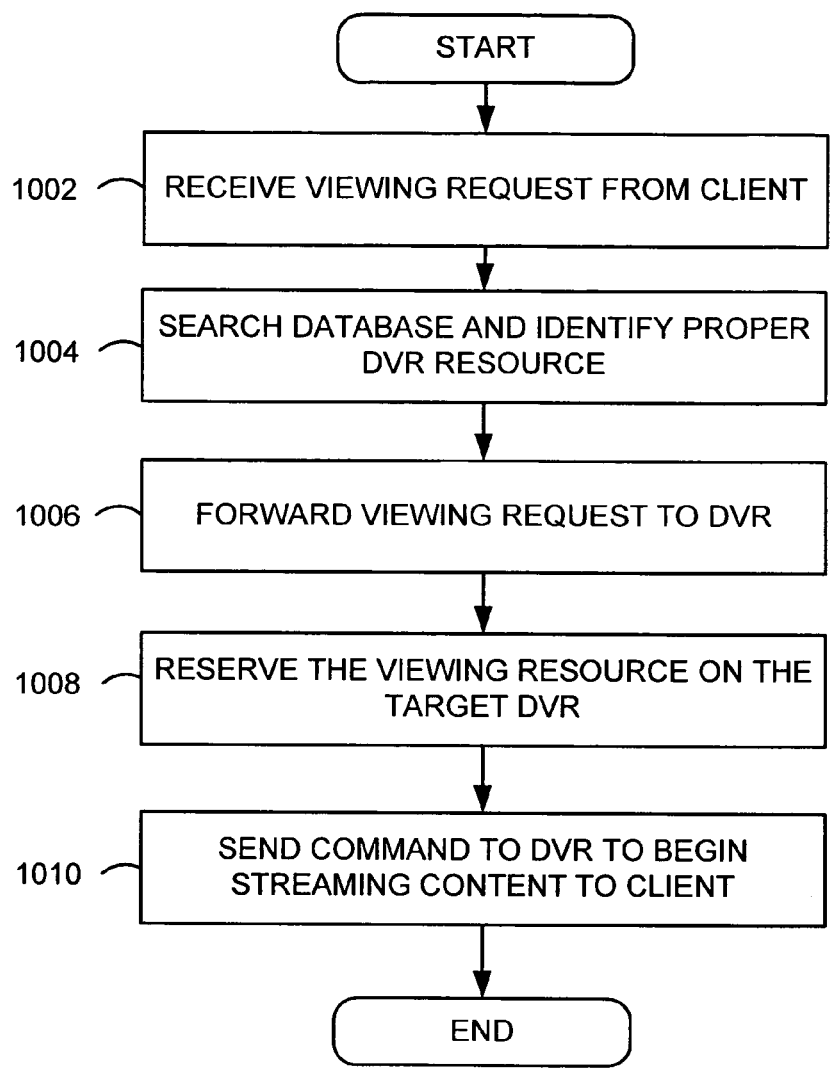
FIG. 10 is a flowchart of one embodiment of a method for processing a viewing request by the DVR proxy system in FIG. 3.

FIG. 10 is a flowchart of one embodiment of a method for processing a viewing request by the DVR proxy system 322 in FIG. 3.

In block 1002, the DVR proxy system 322 receives a viewing request from a client 330 to view a pre-recorded program.

In block 1004, the DVR proxy system 322 searches its database 326 to identify the proper DVR which has the requested program. The viewing request may then be forwarded to the appropriate DVR in block 1006. The DVR proxy system 322 also reserves the viewing resource on the identified DVR so that it'll be available when the client is ready to view the program.

Finally, in block 1010, the DVR proxy system 322 sends a command to the DVR to begin streaming the content to the client 330, regardless of the format (HDTV, analog, etc.). The advantage is that the client can view, on demand, any program desired. The client 330 simply selects the program through the application program 324 provided by the DVR proxy system 322. For example, a given program might have been recorded in HDTV format. Conversion of the input signal may be performed locally at the DVR and then streamed over the network connection (e.g., via an ethernet connection) and played on the client's output device.

Figure 11:
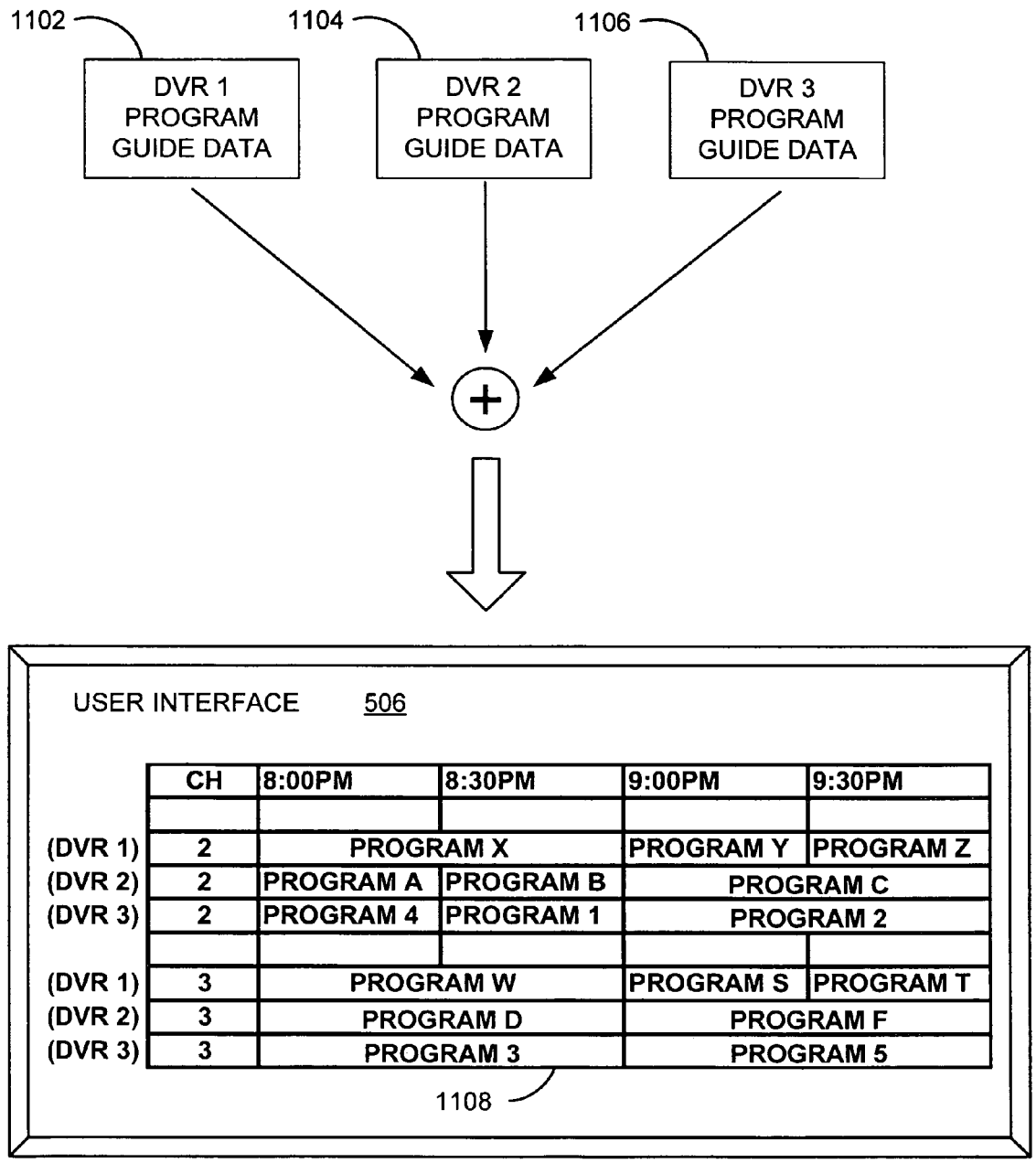
FIG. 11 is a block diagram illustrating consolidation of program guide data from a plurality of DVRs for presentation to the client.

FIG. 11 is a block diagram illustrating consolidation of program guide data from a plurality of DVRs 302, 304, 306 for presentation to the client 330. EPG data 1102, 1104, 1106 from each of the DVRs on the network are consolidated by the DVR proxy system 322 and displayed in a user interface 506 to the client 330. In the embodiment illustrated, the user interface 506 is presented in the form of a grid 1108. The grid 1108 in this case displays the following information: channel, timeslot and corresponding DVR. Note that in some embodiments, the DVRs 302, 304, 306 will not necessarily offer the same channels (e.g., channel 2 in FIG. 11). In other embodiments, the information presented may be different and may be presented in a different format from that shown in FIG. 11. One advantage of the DVR proxy system 322 is that the EPG data from each of the DVRs may be in different formats. The DVR proxy system 322 provides a seamless interface 506 to the client to access all this data. The user interface 506 shown is one example of how the consolidated EPG data might be displayed. For a given TV channel and timeslot, the programs for each DVR is displayed. The DVR proxy system 322 aggregates the EPG data from all the DVRs on the network and provides a fully integrated user interface 506 to the user to utilize. The client might use this interface, for example, to select a previously recorded program to play back or to select a program to record. The DVR proxy system can be kept up-to-date since each DVR uploads its EPG data when there's an update.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method associated with the execution of an application on a digital video recorder proxy system comprising the steps of:

receiving, in a digital video recorder proxy system, a status update from at least one of a plurality of digital video recorders when a change of a resource status of one of the digital video recorders occurs, wherein the status update includes updates for electronic program guide data corresponding to a first DVR, electronic program guide data corresponding to a second DVR, recorded content, and resource status, and the resource comprises storage capacity of each of the digital video recorders, wherein the electronic program guide data corresponding to the first DVR is in a different format from the electronic program guide data corresponding to the second DVR;

storing the status updates received in a database of the digital video recorder proxy system;

identifying, in the digital video recorder proxy system, an available digital video recorder according to the status update from the at least one of the digital video recorders;

consolidating, in the digital video recorder proxy system, the updated electronic program guide data corresponding to the first DVR with the updated electronic program guide data corresponding to the second DVR;

presenting, using the digital video recorder proxy system, the consolidated electronic program guide data to a client, wherein the consolidated program guide data is displayed in a user interface comprising channel information, timeslot information, and corresponding digital video recorder information; and receiving, in the digital video recorder proxy system, viewing, recording or browsing requests from the client.

2. The method of claim 1, wherein the user interface allows an entity to submit viewing, recording or browsing requests to the digital video recorder proxy system.

3. The method of claim 1, wherein upon initialization, the digital video recorder proxy system polls the plurality of digital video recorders for each digital video recorder's status and stores the status in the database.

4. The method of claim 1, wherein the consolidating of electronic program guide data is performed independently of the formatting of the electronic program guide data.

5. The method of claim 1, further including managing all digital video recorder resources by the digital video recorder proxy system.

6. The method of claim 1, further comprising:

searching the digital video recorder proxy system database and identifying an available digital video recorder according to the storage capacity of the digital video recorder;

forwarding, in the digital video recorder proxy system, the recording request to the identified digital video recorder;

reserving, in the digital video recorder proxy system, a recording resource on the identified digital video recorder; and sending, in the digital video recorder proxy system, an acknowledgment back to the client.

7. The method of claim 1, further comprising:

searching the digital video recorder proxy system database and identifying recorded content that matches search criteria specified by the client;

generating, in the digital video recorder proxy system, a list of recorded content that matches the search criteria; and sending, in the digital video recorder proxy system, the same list of content to the client.

8. The method of claim 7, wherein the step of searching the digital video recorder proxy system database and identifying recorded content is comprised of searching metadata of recorded content.

9. The method of claim 1, wherein the step of receiving, in the digital video recorder proxy system, viewing requests further comprises the steps of:

searching metadata of the recorded content in the digital video recorder proxy system database and identifying a digital video recorder based on the metadata;

forwarding, in the digital video recorder proxy system, the viewing request to the identified digital video recorder;

reserving, in the digital video recorder proxy system, a viewing resource on the digital recorder; and streaming, in the digital video recorder proxy system, the requested content to the client.

10. A non-transitory computer-readable medium having a computer program for providing management of a network of digital video recorders comprising:

logic configured to communicate with a digital video recorder proxy system, wherein each of the plurality of digital video recorders is connected to a network and is configured to send its status to the digital video recorder proxy system upon any status change to its local resources, wherein the status includes updates for electronic program guide data corresponding to a first DVR, electronic program guide data corresponding to a second DVR, recorded content, and resource status, and the resource comprises storage capacity of each of the digital video recorders, wherein the electronic program guide data corresponding to the first DVR is in a different format from the electronic program guide data corresponding to the second DVR; and logic configured to consolidate electronic program guide data from each of the plurality of digital video recorders including the updates for electronic program guide data corresponding to the first DVR and the updates for the electronic program guide data corresponding to a second DVR, wherein the consolidated electronic program guide data is stored in a database and the consolidated electronic program guide data is displayed in a user interface comprising channel information, timeslot information and corresponding digital video recorder information, the digital video recorder proxy system further configured to display the consolidated electronic program guide data.

11. The computer-readable medium of claim 10, wherein the digital video recorder proxy system is comprised of:

logic configured to receive a recording request from a client;

logic configured to search the database and identify an available digital video recorder according to the storage capacity of the digital video recorder;

logic configured to forward the recording request to the identified digital video recorder;

logic configured to reserve a recording resource on the identified digital video recorder; and logic configured to send an acknowledgment back to the client.

12. The computer-readable medium of claim 10, wherein the digital video recorder proxy system is further comprised of:

logic configured to receive a browsing request from a client;

logic configured to search metadata of the recorded content in the database and identify recorded content that matches search criteria specified by the client;

logic configured to generate a list of recorded content that matches the search criteria; and logic configured to send the same list of content to the client.

13. The computer-readable medium of claim 10, wherein the digital video recorder proxy system is further comprised of:

logic configured to receive a viewing request from a client;

logic configured to search metadata of the recorded content in the database and identify a digital video recorder resource;

logic configured to forward the viewing request to the identified digital video recorder;

logic configured to reserve a viewing resource on the identified digital video recorder; and logic configured to stream the requested content to the client.

14. A digital video recorder proxy system, comprising:

a plurality of digital video recorders in communication with a digital video recorder proxy system, wherein each of the digital video recorders is connected to a network and is configured to send its respective status to the digital video recorder proxy system upon any status change to its local resources, wherein the status includes updates for electronic program guide data corresponding to a first DVR, electronic program guide data corresponding to a second DVR, recorded content, and storage capacity, wherein the electronic program guide data corresponding to the first DVR is in a different format from the electronic program guide data corresponding to the second DVR; and a digital video recorder proxy system configured to consolidate program guide information from each of the digital video recorders including the updates for electronic program guide data corresponding to the first DVR and the updates for the electronic program guide data corresponding to a second DVR, wherein the consolidated electronic program guide data is stored in a database and the consolidated electronic program guide data is displayed in a user interface comprising channel information, timeslot information and corresponding digital video recorder information.

15. The system of claim 14, wherein the user interface is a graphical user interface.

16. The system of claim 14, wherein the digital video recorder proxy system is further configured to receive status updates from at least one of the digital video recorders.

17. The system of claim 14, wherein the digital video recorder proxy system is a computer.

18. The system of claim 14, wherein the digital video recorder proxy system is a digital video recorder.

19. The system of claim 14, wherein the program guide information is downloaded from at least two different program guide providers.

20. A method associated with the execution of an application on a digital video recorder proxy system comprising the steps of:

consolidating electronic program (EPG) data corresponding to a first DVR with EPG data corresponding to a second DVR resulting in consolidated EPG data;

receiving, in a digital video recorder proxy system, a status update from at least one of a plurality of digital video recorders when a change of a resource status of one of the digital video recorders occurs, wherein the status update includes updates for the electronic program guide data corresponding to the first DVR, the electronic program guide data corresponding to the second DVR, recorded content, and resource status, and the resource comprises storage capacity of each of the digital video recorders, wherein the electronic program guide data corresponding to the first DVR is in a different format from the electronic program guide data corresponding to the second DVR;

storing the status updates received in a database of the digital video recorder proxy system;

updating the consolidated EPG data according to the status update;

identifying, in the digital video recorder proxy system, an available digital video recorder according to the status update from the at least one of the digital video recorders;

presenting, using the digital video recorder proxy system, the consolidated electronic program guide data to a client, wherein the consolidated program guide data is displayed in a user interface comprising channel information, timeslot information, and corresponding digital video recorder information; and receiving, in the digital video recorder proxy system, viewing, recording or browsing requests from the client.

* * * * *